United States Patent
Hofmann et al.

(10) Patent No.: US 10,655,672 B2
(45) Date of Patent: May 19, 2020

(54) METHOD AND DEVICE FOR PRODUCING AN ANGULAR CONTACT ROLLER BEARING

(71) Applicant: Schaeffler Technologies AG & Co. KG, Herzogenaurach (DE)

(72) Inventors: Heinrich Hofmann, Schweinfurt (DE); Reinhard Rumpel, Rottendorf (DE); Ernst Geiger, Hallerndorf (DE); Rainer Eidloth, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 96 days.

(21) Appl. No.: 15/746,538

(22) PCT Filed: Aug. 3, 2016

(86) PCT No.: PCT/DE2016/200355
§ 371 (c)(1),
(2) Date: Jan. 22, 2018

(87) PCT Pub. No.: WO2017/020907
PCT Pub. Date: Feb. 9, 2017

(65) Prior Publication Data
US 2018/0216662 A1    Aug. 2, 2018

(30) Foreign Application Priority Data

Aug. 4, 2015 (DE) .................. 10 2015 214 847

(51) Int. Cl.
*F16C 19/36* (2006.01)
*F16C 33/46* (2006.01)
(Continued)

(52) U.S. Cl.
CPC .......... *F16C 19/364* (2013.01); *F16C 19/225* (2013.01); *F16C 33/366* (2013.01);
(Continued)

(58) Field of Classification Search
CPC ......... Y10T 29/49636; Y10T 29/49643; Y10T 29/49655; Y10T 29/49679; Y10T 29/4968;
(Continued)

(56) References Cited

U.S. PATENT DOCUMENTS 1,397,142 A    11/1921   Palmgren
2,042,417 A *   5/1936   Wise ...................... F16C 33/48
                                                             384/571
(Continued)

FOREIGN PATENT DOCUMENTS

CH    463886 A    10/1968
DE    151483 A1   5/1904
(Continued)

OTHER PUBLICATIONS

Walzlager, "Rolling Bearings" Schaeffler Catalog, Oct. 2008, pp. 393 and 396.

*Primary Examiner* — Sarang Afzali
*Assistant Examiner* — Darrell C Ford
(74) *Attorney, Agent, or Firm* — Adam Southworth

(57) ABSTRACT

The disclosure relates to a method for producing an angular contact roller bearing with unilaterally delimiting rims. The disclosure also relates to multiple variants of a device for assembling the angular contact roller bearing. The method may include conically forming an inner raceway into a cylindrical section of an outer shell surface of an inner bearing ring such that the inner raceway is inclined relative to the bearing axis of rotation (AL) and is delimited at one end by a rim, conically forming an outer raceway into a cylindrical section of an inner shell surface of an outer bearing ring such that the outer raceway is inclined relative to the bearing axis of rotation (AL) and is delimited at one end by a rim, and assembling the inner and outer bearing rings and a multiplicity of roller-type rolling bodies, which (Continued)

roll on the raceways of said bearing rings, in accordance with an eccentric assembly method.

8 Claims, 10 Drawing Sheets

(51) Int. Cl.
    *F16C 33/49*     (2006.01)
    *F16C 43/06*     (2006.01)
    *F16C 19/22*     (2006.01)
    *F16C 33/36*     (2006.01)
    *F16C 33/58*     (2006.01)
    *F16C 9/02*     (2006.01)
    *F16C 43/08*     (2006.01)

(52) U.S. Cl.
    CPC ........ *F16C 33/4605* (2013.01); *F16C 33/495* (2013.01); *F16C 33/585* (2013.01); *F16C 43/06* (2013.01); *F16C 9/02* (2013.01); *F16C 33/586* (2013.01); *F16C 43/08* (2013.01)

(58) Field of Classification Search
    CPC ......... Y10T 29/49682; Y10T 29/49684; Y10T 29/49686; Y10T 29/49696; F16C 19/364; F16C 33/585; F16C 33/366; F16C 19/225; F16C 33/495; F16C 33/4605; F16C 43/08; F16C 43/06; F16C 33/586; F16C 9/02
    USPC ................. 29/898, 898.04, 898.047, 898.06, 29/898.061, 898.062, 898.063, 898.064, 29/898.07
See application file for complete search history.

(56) References Cited

U.S. PATENT DOCUMENTS

| | | | | |
|---|---|---|---|---|
| 3,989,326 | A * | 11/1976 | Hormann | F16C 19/364 384/572 |
| 5,861,067 | A * | 1/1999 | Hetzner | C21D 1/09 148/326 |
| 2011/0007993 | A1 * | 1/2011 | Doeppling | F16C 33/36 384/559 |
| 2011/0026866 | A1 * | 2/2011 | Doeppling | F16C 33/36 384/494 |
| 2015/0128396 | A1 * | 5/2015 | Motomura | B23P 19/00 29/271 |

FOREIGN PATENT DOCUMENTS

| | | |
|---|---|---|
| DE | 168499 A1 | 3/1906 |
| DE | 6917609 U | 9/1969 |
| DE | 2407477 A1 | 8/1975 |
| DE | 2420210 A1 | 10/1975 |
| DE | 2651827 A1 | 5/1978 |
| DE | 8713057 U1 | 11/1987 |

* cited by examiner

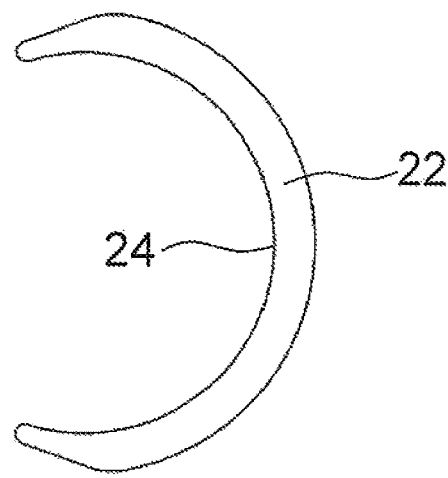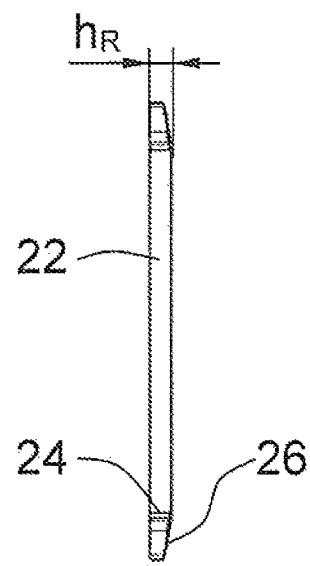
Fig. 10a  Fig. 10b
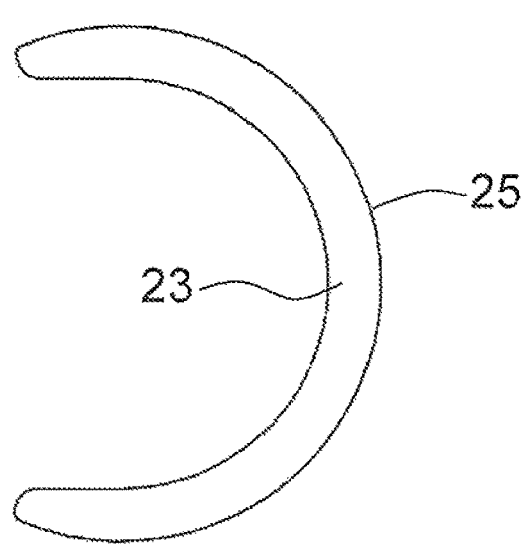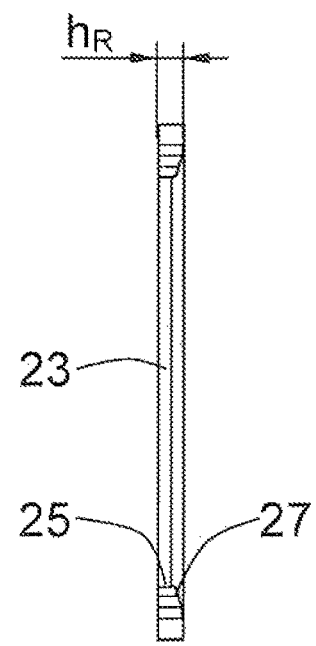
Fig. 11a  Fig. 11b

METHOD AND DEVICE FOR PRODUCING AN ANGULAR CONTACT ROLLER BEARING

CROSS-REFERENCE TO RELATED APPLICATIONS

This application is the U.S. National Phase of PCT Appln. No. PCT/DE2016/200355 filed Aug. 3, 2016, which claims priority to DE 102015214847.5 filed Aug. 4, 2015, the entire disclosures of which are incorporated by reference herein.

TECHNICAL FIELD

The disclosure relates to a method for producing a single-row angular contact roller bearing and to a device for carrying out the method. Said angular contact roller bearing can be used advantageously for the mounting of the crankshaft in a motor vehicle internal combustion engine.

BACKGROUND

The bearing type most commonly used for the mounting of the crankshaft in motor vehicle internal combustion engines is the single-row deep-groove ball bearing, because this is distinguished by uniformly high radial and axial load capacities and has the highest rotational speed limits of all bearing types owing to its low friction. Said deep-groove ball bearing is, in a known manner, composed of an outer bearing ring and of an inner bearing ring and of a multiplicity of bearing balls arranged between the bearing rings, which bearing balls roll in groove-like raceways formed into the inner side of the outer bearing ring and into the outer side of the inner bearing ring and are guided with uniform spacings to one another by means of a bearing cage. Here, the insertion of the bearing balls into the deep-groove ball bearing is normally performed using the eccentric assembly method that has become known from DE 168 499 A1, in which the two bearing rings are arranged eccentrically with respect to one another, the free space thus formed between the bearing rings is filled with the bearing balls, the bearing rings are subsequently moved into a concentric position with respect to one another utilizing their elasticity, and the bearing cage is inserted after the bearing balls have been uniformly circumferentially distributed.

In practice, however, it has been found that such deep-groove ball bearings, owing to the small maximum number of bearing balls that can be installed, which number is dependent on the dimensions of the inner and of the outer bearing ring and on the diameter of the bearing balls, are always subject to certain limits in particular with regard to the radial load capacity of the bearing. In the past, therefore, a multiplicity of solutions has been proposed, such as for example a non-closed filling opening arranged in the oppositely situated rims of the raceway of the outer and of the inner bearing ring, as per DE 151 483 A1, or a similarly designed closable filling opening, as per DE 24 07 477 A1, by means of which it has been sought to achieve an increase in the radial load capacity of deep-groove ball bearings through an increase in the number of bearing balls, though said solutions have not been able to become established in practice owing to the disadvantages resulting from such filling openings.

Another possibility for increasing the load capacity of the bearing arrangement of the crankshaft in a motor vehicle internal combustion engine would be to replace the previously used deep-groove ball bearing with a cylindrical roller bearing of the type NUP, such as is known for example from the applicant's catalogue "Wälzlager" ["Rolling bearings"], dated October 2008, on pages 393 and 396. Said cylindrical roller bearing has two lateral rims both on the inner bearing ring and on the outer bearing ring, and is suitable for accommodating high radial loads and axial loads in both directions. Such cylindrical roller bearings however have very high manufacturing costs owing to the high level of cutting machining, in particular for the raceway production and for the rim machining, and would furthermore in turn be overdimensioned in terms of their load capacity, such that they are ultimately unsuitable for use as fixed bearings in motor vehicle manual transmissions.

A further bearing type which is suitable for the mounting of the crankshaft in a motor vehicle internal combustion engine and which forms the closest prior art for the present disclosure and whose capacity for accommodating radial forces and axial forces in both directions is greater than that of deep-groove ball bearings has become known from the documents DE 6 917 609 U and CH 463 886 A. Said documents each disclose an angular contact roller bearing which is composed substantially of an inner bearing ring with an inner raceway, which is arranged on the outer shell surface of said inner bearing ring obliquely with respect to the radial bearing axis, and of a rim which delimits said raceway at its smallest diameter, of an outer bearing ring with outer raceway, which is arranged on the inner shell surface of said outer bearing ring, likewise obliquely with respect to the radial bearing axis, and of a rim which delimits said raceway at its greatest diameter, and of a multiplicity of roller-type rolling bodies which are arranged between the bearing rings and which roll on the raceways of said bearing rings and which are held with uniform spacings to one another in a circumferential direction by means of a bearing cage. To permit the insertion of the rolling bodies in the form of tapered rollers into the bearing cage which is formed in each case as a pocket-type or window-type cage, it is the case that the rim on the inner bearing ring in the case of the angular contact roller bearing as per DE 6 917 609 U, and the rim on the outer bearing ring in the case of the angular contact roller bearing as per CH 463 886 A, is formed as a separate component which is fastened to the inner or outer bearing ring respectively after the bearing assembly process. This is performed, in the case of the angular contact roller bearing as per DE 6 917 609 U, through a separate slotted ring which is U-shaped in cross section and the radial limbs of which engage in to corresponding grooves in the rim and in the inner bearing ring, and in the case of the angular contact roller bearing as per CH 463 886 A, through an encircling collar integrally formed on the underside of the rim, which collar is pressed into the outer bearing ring.

In such angular contact roller bearings, although the fact that only one of the bearing rings is formed integrally with only one lateral rim has the effect that the level of cutting machining during the raceway production and during the rim machining, and thus also the overall costs for the bearing manufacture, are much lower than in the case of the cylindrical roller bearing described above, it is nevertheless the case in such angular contact roller bearings that the formation of the rim on the respective other bearing ring as a separate rim disk, the additional installation thereof on said bearing ring and the required precision manufacture of the contact surfaces on said rim disk and on the associated bearing ring have an adverse effect on the production costs thereof. Furthermore, in the case of such angular contact roller bearings, there is the risk that the fastening of the separate rim disk is not sufficient to withstand even high radial or axial load peaks, such that the rim disk can become detached during bearing operation, ultimately resulting in bearing failure.

SUMMARY

Proceeding from the discussed disadvantages of the solutions of the known prior art, it is therefore an object of the disclosure to make possible cost-efficient production of an in particular single-row angular contact roller bearing having rims which delimit the raceways in each case on one side.

According to the disclosure, said object is achieved by a method having the features described herein and with a device described herein. Advantageous refinements of the disclosure can also be found in the disclosure and figures.

The method according to the disclosure serves for producing an angular contact roller bearing, of which the outer shell surface of the inner bearing ring and the inner shell surface of the outer bearing ring are, in each case outside the raceways, of cylindrical form so as to run coaxially with respect to the bearing axis of rotation at least in sections. The raceways of the two bearing rings are each formed in conical fashion into the shell surfaces which were cylindrical before this machining step. The rims which are thus formed and which delimit the raceways in each case on one side are thus each formed integrally with the bearing rings.

Preferably, it is provided that the roller-type rolling bodies are preferably formed as tapered rollers which have a taper angle in the range from 1° to 4°, and which roll with an envelope circle angle of between 3° and 7° on their raceways. In the case of the radial rolling bearing designed in this way being used for the mounting of the crankshaft in a motor vehicle internal combustion engine, a taper angle of 1.5° to 2.5°, preferably of 2°, and an envelope circle angle of 5.5° to 6.5°, preferably of 6°, have proven to be particularly suitable here owing to the radial and axial loads that arise. It must however be noted that the method according to the disclosure is not intended to be restricted to production of tapered roller bearings, because it is equally also possible for other roller bearings with roller axes arranged obliquely with respect to the bearing central axis to be assembled in this way. Thus, instead of the tapered rollers mentioned by way of example, use may also be made of cylindrical rollers or needles or rollers with spherical shell surfaces, such as self-aligning rollers or barrel-type rollers.

Furthermore, it is advantageous for the gap between the outer shell surface of the inner bearing ring and the inner shell surface of the outer bearing ring to be dimensioned such that two times the dimension of said gap is greater than the greatest diameter of the roller-type rolling bodies. Such dimensioning of the gap between the inner and the outer bearing ring is necessary in order to permit the insertion of the roller-type rolling bodies into the angular contact roller bearing in accordance with the assembly method described here.

Moreover, it is advantageous for both the rim which delimits the raceway in the inner bearing ring and the rim which delimits the raceway in the outer bearing ring to be formed in an equal minimum height of 18% to 22%, preferably of approximately 20%, of the greatest diameter of the roller-type rolling bodies. By such a design of the rims and the associated raceway depth, it is ensured that high axial forces in one direction which arise during bearing operation can be accommodated with the least possible rim friction, whereas relatively low axial forces in the other direction are accommodated by means of the oblique raceways.

An expedient refinement of the method according to the disclosure provides that, after the installation of the roller-type rolling bodies, a comb-type cage which is composed of a cage ring and of a multiplicity of axial cage webs is inserted into the angular contact roller bearing. Said bearing cage additionally has, on its cage webs, multiple uniformly circumferentially distributed detent webs by means of which the bearing cage is axially fixable in position either on the inner surface of the rim on the outer bearing ring or on the inner surface of the rim on the inner bearing ring. Said detent webs are integrally formed on the cage webs so as to be inclined with respect to the bearing central axis analogously to the roller axes of the roller-type rolling bodies and, during the insertion of the bearing cage into the angular contact roller bearing, are firstly elastically deformed in the direction of the cage webs until said detent webs engage with detent action with their free ends behind the rim on the outer bearing ring, in the case of the bearing cage being inserted from the large diameter side of the tapered rollers, and engage with detent action with their free ends behind the rim on the inner bearing ring, in the case of the bearing cage being inserted from the small diameter side of the tapered rollers. In this way, the bearing cage, which was hitherto fixed in position only in one axial direction as a result of the abutment of the bearing cage against one of the face sides of the roller-type rolling bodies, is also fixed in position in the other axial direction. Here, too, however, it must be noted that the use of a comb-type cage as a bearing cage is not restricted to said cage type, because it is also possible for a two-part plate rivet cage to be used as bearing cage.

Furthermore, it is advantageous for two elastomer sealing disks having metal reinforcement to be inserted, axially on both sides of the roller-type rolling bodies, into encircling fastening grooves in the inner shell surface of the outer bearing ring and for the angular contact roller bearing to thus be sealed off against contamination from the outside, and against the escape of lubricant that has possibly been introduced into the bearing interior space. This design is of note because, in the case of the angular contact roller bearings described in the introduction, owing to the absence of suitable fastening surfaces and suitable sealing surfaces for such elastomer sealing disks, no such sealing is possible. Owing to the planar form of the outer shell surface of the inner bearing ring and of the inner shell surface of the outer bearing ring, the required fastening and sealing surfaces are however provided in the case of the angular contact roller bearing designed according to the disclosure.

According to the disclosure, the object may be achieved by a method for producing an angular contact roller bearing, which may include the following method steps:

conically forming an inner raceway (4) into a cylindrical section of an outer shell surface (3) of an inner bearing ring (2) such that the inner raceway (4) is inclined relative to the bearing axis of rotation (AL) and is delimited at one end by a rim (5), conically forming an outer raceway (8) into a cylindrical section of an inner shell surface (7) of an outer bearing ring (6) such that the outer raceway (8) is inclined relative to the bearing axis of rotation (AL) and is delimited at one end by a rim (9), assembling the inner and outer bearing rings (2, 6) and a multiplicity of roller-type rolling bodies (10), which roll on the raceways of said bearing rings, in accordance with an eccentric assembly method known per se as an assembly method for deep-groove ball bearings.

In a first variant of said eccentric assembly method, it is disclosed herein that, in a first step, the inner bearing ring is placed, with its face side formed with the rim, onto a horizontal assembly plane with a convex sickle-shaped auxiliary ramp in such a way that said inner bearing ring bears with its rim against the inner diameter side of the auxiliary ramp. Subsequently, in a second step, the outer bearing ring is arranged, with its face side formed with the rim upward, eccentrically with respect to the inner bearing ring such that, at one side, the auxiliary ramp is arranged between the bearing rings and, at the other side, offset 180° with respect to the center of the auxiliary ramp, the bearing rings bear against one another. Then, as a third step, the sickle-shaped free space formed between the outer bearing ring and the inner bearing ring is filled with the roller-type rolling bodies in the form of tapered rollers such that the relatively small face sides of said roller-type rolling bodies lie on the oblique side of the auxiliary ramp.

A second variant of the eccentric assembly method differs from the first variant in that, in a first step, the outer bearing ring is placed, with its face side formed with the rim, onto a horizontal assembly plane with a convex sickle-shaped auxiliary ramp in such a way that said outer bearing ring bears with its rim against the outer diameter side of the auxiliary ramp. Subsequently, in a second step, the inner bearing ring is arranged, with its face side formed with the rim upward, eccentrically with respect to the outer bearing ring such that, at one side, the auxiliary ramp is arranged between the bearing rings and, at the other side, offset 180° with respect to the center of the auxiliary ramp, the bearing rings bear against one another. Then, the third step of said variant consists again in that the sickle-shaped free space formed between the inner bearing ring and the outer bearing ring is filled with the roller-type rolling bodies in the form of tapered rollers such that the relatively large face sides of said roller-type rolling bodies lie on the oblique side of the auxiliary ramp.

Independently of the two variants of the eccentric assembly method, it is also disclosed that, in a fourth step, the outer bearing ring is clamped, at the level of the contact point with the inner bearing ring and at the level of a point on the outer shell surface of said outer bearing ring which is offset 180° with respect to the contact point, such that the outer bearing ring is slightly ovalized within its elasticity limit. Subsequently, in one embodiment, in a fifth step, the inner bearing ring is displaced into a coaxial position with respect to the outer bearing ring, and the roller-type rolling bodies are uniformly circumferentially distributed in their raceways in the bearing rings, with the ovalization of the outer bearing ring being eliminated.

In the case of the first variant of the eccentric assembly method according to the disclosure being implemented, it is subsequently the case that, in a sixth step, the bearing cage in the form of a comb-type cage may be inserted with its cage webs between the roller-type rolling bodies from the side with the relatively small face sides of said roller-type rolling bodies, and said bearing cage is engaged with detent action against the inner surface of the rim on the inner bearing ring. In the case of the second variant of the eccentric assembly method according to the disclosure being implemented, it is by contrast the case, in another embodiment, that, in a sixth step, the bearing cage in the form of a comb-type cage is inserted with its cage webs between the roller-type rolling bodies from the side with the relatively large face sides of said roller-type rolling bodies, and said bearing cage is engaged with detent action against the inner surface of the rim on the outer bearing ring.

According to one embodiment, it is then the case, as a conclusion to the eccentric assembly method according to the disclosure, that, in a final step, the bearing interior space is filled with lubricant, and the two elastomer sealing disks are inserted into the encircling fastening grooves in the inner shell surface of the outer bearing ring.

Finally, the stated object is also achieved, in the case of an angular contact roller bearing of the above-described type, by two variants of a device for carrying out the described assembly method.

Here, to carry out the first variant of the eccentric assembly method according to the disclosure, it is proposed in one embodiment that the auxiliary ramp which bears with its inner diameter side against the inner bearing ring has an oblique side, which tapers toward the outer bearing ring with the angle of inclination of the raceway in the inner bearing ring, and a maximum ramp height which corresponds to the rim height on the inner bearing ring. To carry out the second variant of the eccentric assembly method according to the disclosure, it is by contrast proposed in another embodiment that the auxiliary ramp which bears with its outer diameter side against the outer bearing ring has an oblique side, which tapers toward the inner bearing ring with the angle of inclination of the raceway in the outer bearing ring, and a maximum ramp height which corresponds to the rim height on the outer bearing ring.

In summary, the method according to the disclosure and the devices according to the disclosure serve for producing an in particular single-row angular contact roller bearing which has the advantage in relation to the single-row angular contact roller bearings known from the prior art that, despite the maximum rolling body fill factor of approximately 60% that is achievable with the eccentric assembly method, it has a greater load capacity than a similarly assembled single-row deep-groove ball bearing, because the roller-type rolling bodies that are used are in linear contact with their raceways rather than in punctiform contact as in the case of bearing balls. With regard to the achievable load capacity, an angular contact roller bearing designed according to the disclosure ranks here as a completely new bearing type [e.g. type series ARU (Angular Roller Unit) 207=40 kN] approximately in the middle between the load capacity of a single-row deep-groove ball bearing [e.g. type series 6207=25.5 kN] and the load capacity of a single-row cylindrical roller bearing [e.g. type series NUP 207E=56 kN]. Furthermore, owing to the singly conical raceways formed into the cylindrical inner and outer shell surfaces of the two bearing rings, the level of cutting machining during the production and machining of the raceways and of the rims of the angular contact roller bearing according to the disclosure falls within manageable cost limits, and, owing to the rims formed here, which are formed integrally with the bearing rings, there is at the same time no longer a need for separate rim disks. In conjunction with the eccentric assembly method for the roller-type rolling bodies and with the comb-type cage that is used, the angular contact roller bearing according to the disclosure is thus distinguished overall by a low level of assembly outlay and thus by low overall costs for the bearing manufacture.

BRIEF DESCRIPTION OF THE DRAWINGS

A preferred embodiment of an angular contact roller bearing and two alternative variants of the method according to the disclosure for the assembly thereof and two associated devices for carrying out said method variants will be discussed in more detail below with reference to the appended drawings, in which:

FIG. 10a shows an illustration of the auxiliary ramp for carrying out the first variant of the assembly method according to the disclosure in a plan view;

FIG. 10b shows an illustration of the auxiliary ramp for carrying out the first variant of the assembly method according to the disclosure in a sectional view;

FIG. 11a shows an illustration of the auxiliary ramp for carrying out the second variant of the assembly method according to the disclosure in a plan view; and FIG. 11b shows an illustration of the auxiliary ramp for carrying out the second variant of the assembly method according to the disclosure in a sectional view.

DETAILED DESCRIPTION

Figure 1:
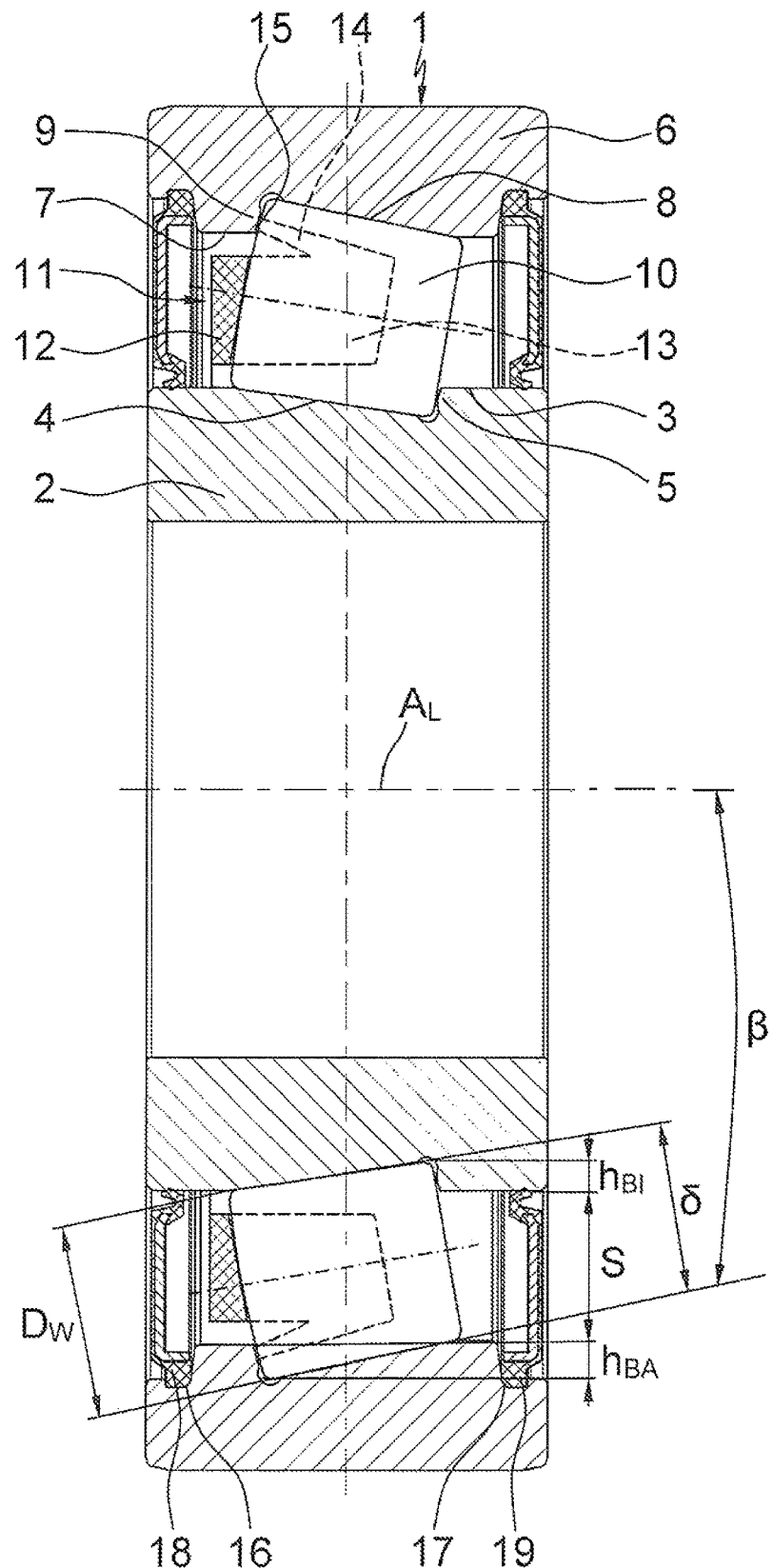
FIG. 1 shows an enlarged illustration of a cross section through a single-row angular contact roller bearing having rims formed integrally with the bearing rings.

FIG. 1 illustrates a cross section through a single-row angular contact roller bearing 1 which is suitable for example as a replacement for the previously used deep-groove ball bearing for the mounting of the crankshaft in motor vehicle internal combustion engines. As can be clearly seen, said angular contact roller bearing 1 is composed of an inner bearing ring 2 with an inner raceway 4, which is arranged on the outer shell surface 3 of said inner bearing ring so as to be inclined with respect to the bearing axis of rotation AL and which is delimited at its smallest diameter by a rim 5, and of an outer bearing ring 6 with an outer raceway 8, which is arranged on the inner shell surface 7 of said outer bearing ring likewise so as to be inclined with respect to the bearing axis of rotation AL and which is delimited at its greatest diameter by a rim 9. Furthermore, between the bearing rings 2, 6, there is arranged a multiplicity of roller-type rolling bodies 10 which roll on the raceways 4, 8 of said bearing rings and which are held with uniform spacings to one another in a circumferential direction by a bearing cage 11.

It can furthermore be seen in FIG. 1 that the outer shell surface 3 of the inner bearing ring 2 and the inner shell surface 7 of the outer bearing ring 6 are, in each case outside the raceways 4, 8, of cylindrical form so as to run coaxially with respect to the bearing axis of rotation AL, and the raceways 4, 8 of the two bearing rings 2, 6 are each formed in conical fashion into the cylindrical shell surfaces 3, 7. The rims 5, 9 which are thus formed and which delimit the raceways 4, 8 in each case on one side are thus each formed integrally with the bearing rings 2, 6.

It can likewise be seen in FIG. 1 that the roller-type rolling bodies 10 are formed as tapered rollers which have a taper angle $\delta$ preferably of 2° and which roll with an envelope circle angle $\beta$ preferably of 6° on their raceways 4, 8. Furthermore, the gap S between the outer shell surface 3 of the inner bearing ring 2 and the inner shell surface 7 of the outer bearing ring 6 is dimensioned such that two times the dimension of said gap is greater than the greatest diameter DW of the roller-type rolling bodies 10, in order to permit the insertion of the roller-type rolling bodies 10 into the radial rolling bearing 1 in accordance with the assembly method described in more detail below. Furthermore, both the rim 5 which delimits the raceway 4 in the inner bearing ring 2 and the rim 9 which delimits the raceway 8 in the outer bearing ring 6 have an equal minimum height hBI, hBA of approximately 20%, of the greatest diameter DW of the roller-type rolling bodies 10, in order to enable high axial forces in one direction that arise during bearing operation to be accommodated with the least possible rim friction.

It can also be seen in FIG. 1 that the bearing cage 11 is preferably formed by a comb-type cage which is insertable into the radial rolling bearing 1 after the installation of the roller-type rolling bodies 10. Here, the bearing cage 11, which is composed of a cage ring 12 and of a multiplicity of axial cage webs 13, has, on its cage webs 13 (obscured in the illustration), multiple uniformly circumferentially distributed detent webs 14 (likewise obscured in the illustration), which run so as to be inclined with respect to the bearing axis of rotation AL and by which the bearing cage 11 is axially fixable in position on the inner surface 15 of the rim 9 on the outer bearing ring 6.

Finally, it can also be seen in FIG. 1 that the radial rolling bearing 1 is sealed off against contamination from the outside, and against the escape of lubricant that has possibly been introduced into the bearing interior space 20, by two elastomer sealing disks 18, 19 which are inserted, axially on both sides of the roller-type rolling bodies 10, into encircling fastening grooves 16, 17 in the inner shell surface 7 of the outer bearing ring 6 and which have metal reinforcement.

This design which is known per se in other rolling bearing types is possible in the case of the radial rolling bearing 1 according to the disclosure, by contrast to known angular contact roller bearings, only because said radial rolling bearing 1 according to the disclosure, by the radially planar form of the outer shell surface 3 of the inner bearing ring 2 and of the inner shell surface 7 of the outer bearing ring 6, has suitable fastening surfaces and suitable sealing surfaces for such elastomer sealing disks 18, 19.

Figure 2A:
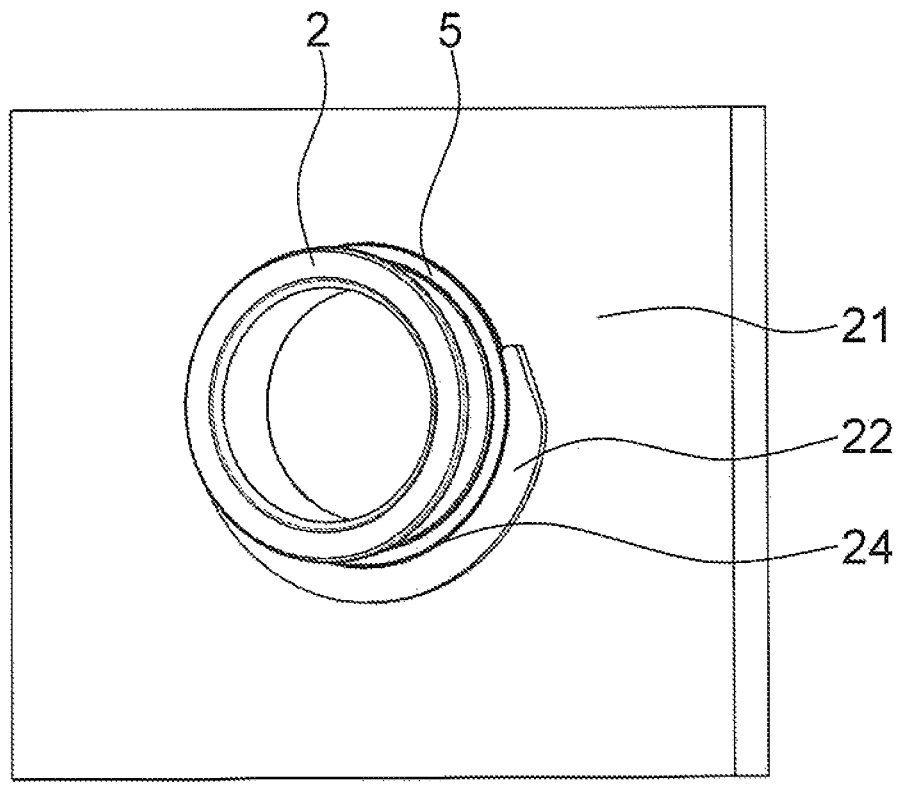
FIG. 2a shows an illustration of the first step of the first variant of the assembly method according to the disclosure in a plan.
Figure 2B:
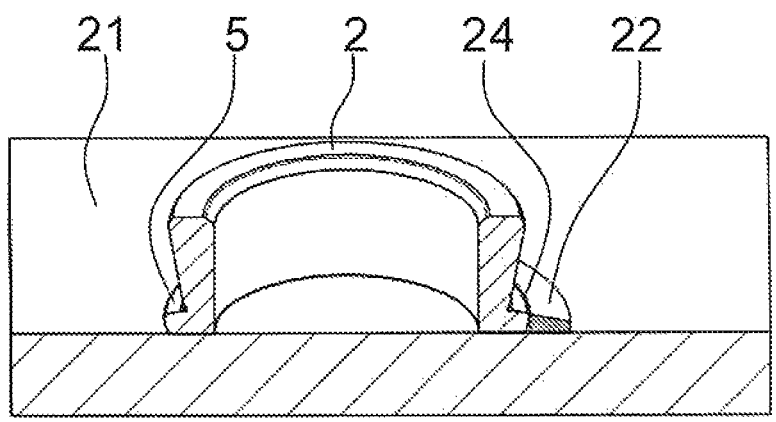
FIG. 2b shows an illustration of the first step of the first variant of the assembly method according to the disclosure in a sectional view.

FIGS. 2a, 2b, 3a, 3b and 4a, 4b furthermore schematically illustrate the first steps of a first variant of an assembly method for the angular contact roller bearing 1 according to the disclosure. Said assembly method is substantially a modified eccentric assembly method known per se as an assembly method for deep-groove ball bearings, in the case of which, as can be seen in FIGS. 2a and 2b, in a first step, the inner bearing ring 2 is placed, with its face side formed with the rim 5, onto a horizontal assembly plane 21 with a convex sickle-shaped auxiliary ramp 22 in such a way that said inner bearing ring bears with its rim 5 against the inner diameter side 24 of the auxiliary ramp 22.

Figure 3A:
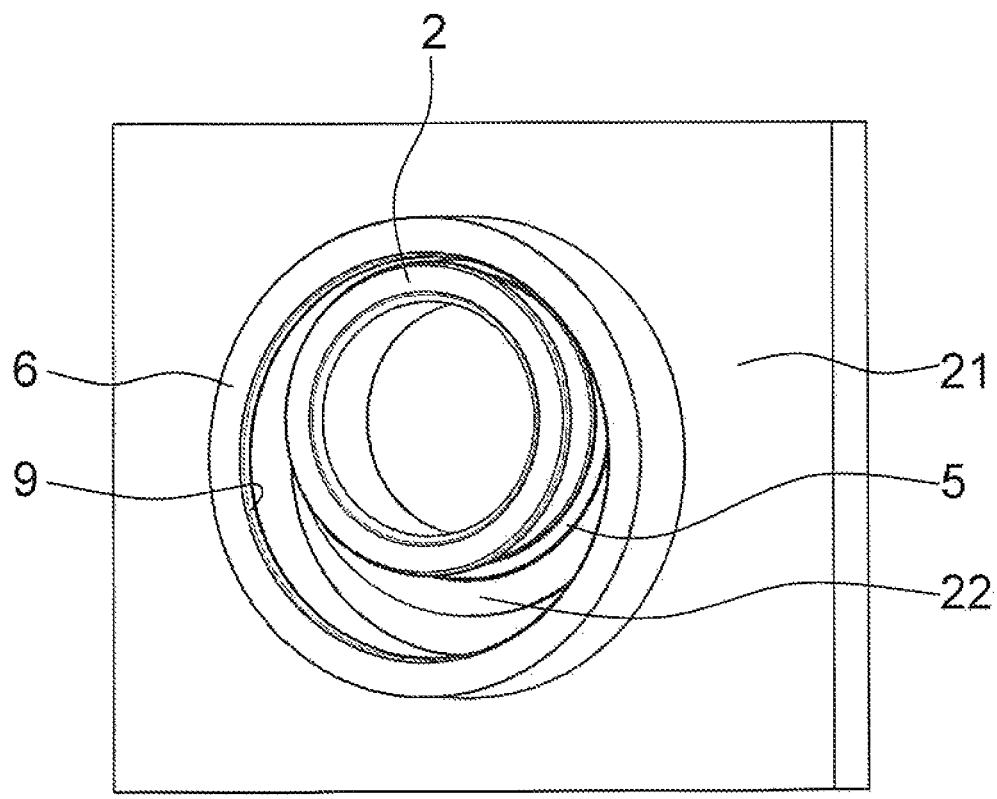
FIG. 3a shows an illustration of the second step of the first variant of the assembly method according to the disclosure in a plan view.
Figure 3B:
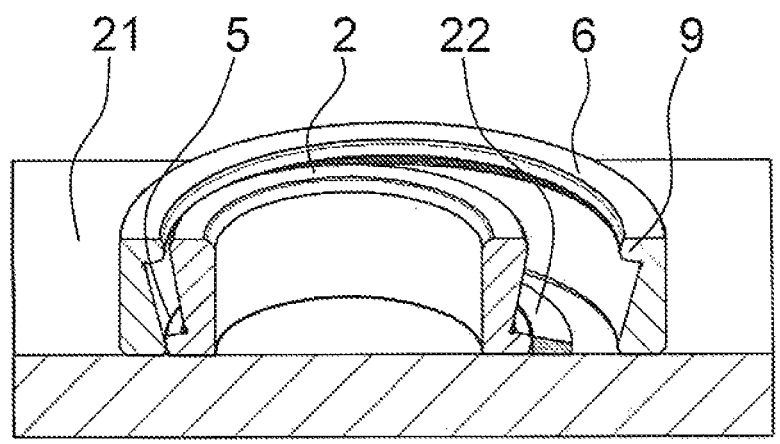
FIG. 3b shows an illustration of the second step of the first variant of the assembly method according to the disclosure in a sectional view.

Subsequently, in a second step, the outer bearing ring 6 is arranged, with its face side formed with the rim 9 upward, eccentrically with respect to the inner bearing ring 2 such that, as can be clearly seen in FIGS. 3a and 3b, at one side, the auxiliary ramp 22 is arranged between the bearing rings 2, 6 and, at the other side, offset 180° with respect to the center of the auxiliary ramp 22, the bearing rings 2, 6 bear against one another.

Figure 4A:
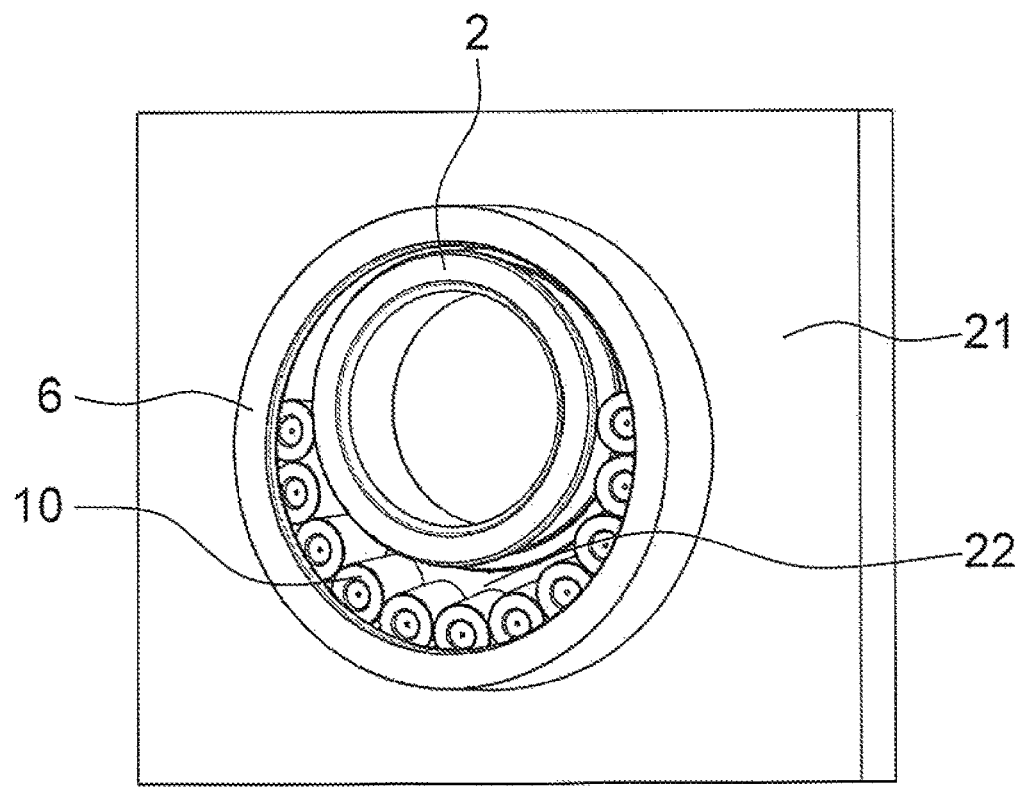
FIG. 4a shows an illustration of the third step of the first variant of the assembly method according to the disclosure in a plan view.
Figure 4B:
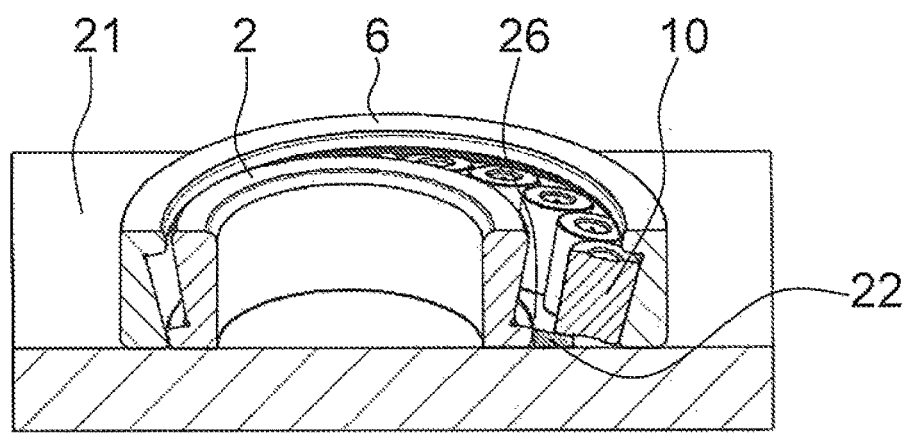
FIG. 4b shows an illustration of the third step of the first variant of the assembly method according to the disclosure in a sectional view.

In a third step illustrated in FIGS. 4a and 4b, the sickle-shaped free space formed between the outer bearing ring 6 and the inner bearing ring 2 is filled with the roller-type rolling bodies 10 in the form of tapered rollers such that the relatively small face sides of said roller-type rolling bodies lie on the oblique side 26 of the auxiliary ramp 22.

Figure 5A:
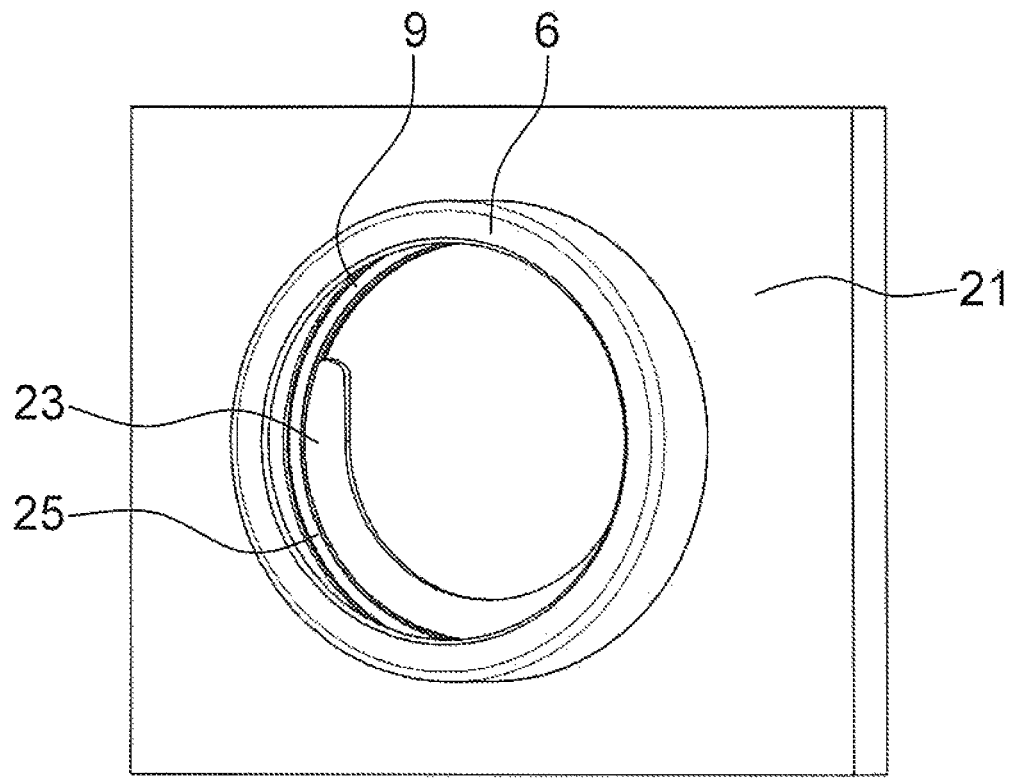
FIG. 5a shows an illustration of the first step of the second variant of the assembly method according to the disclosure in a plan view.
Figure 5B:
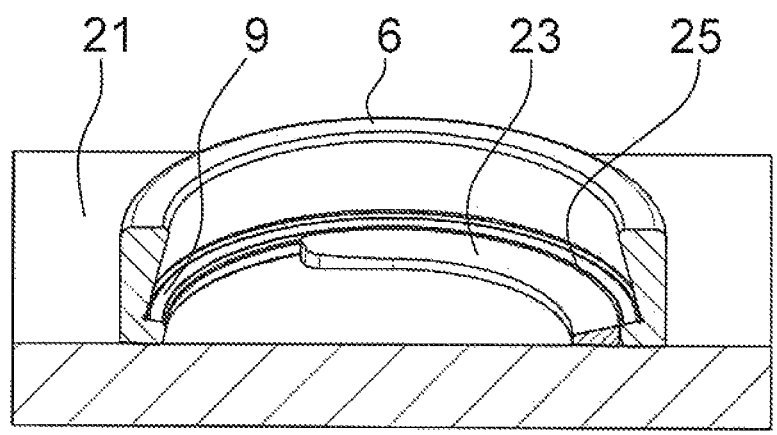
FIG. 5b shows an illustration of the first step of the second variant of the assembly method according to the disclosure sectional view.

The second variant, illustrated in FIGS. 5a, 5b, 6a, 6b and 7a, 7b, of the assembly method for the angular contact roller bearing according to the disclosure is likewise a modified eccentric assembly method and differs from the first variant in that, in the first step shown in FIGS. 5a and 5b, in this case the outer bearing ring 6 is placed, with its face side formed with the rim 9, onto a horizontal assembly plane 21 with a convex sickle-shaped auxiliary ramp 23 in such a way that said outer bearing ring bears with its rim 9 against the outer diameter side 25 of the auxiliary ramp 23.

Figure 6A:
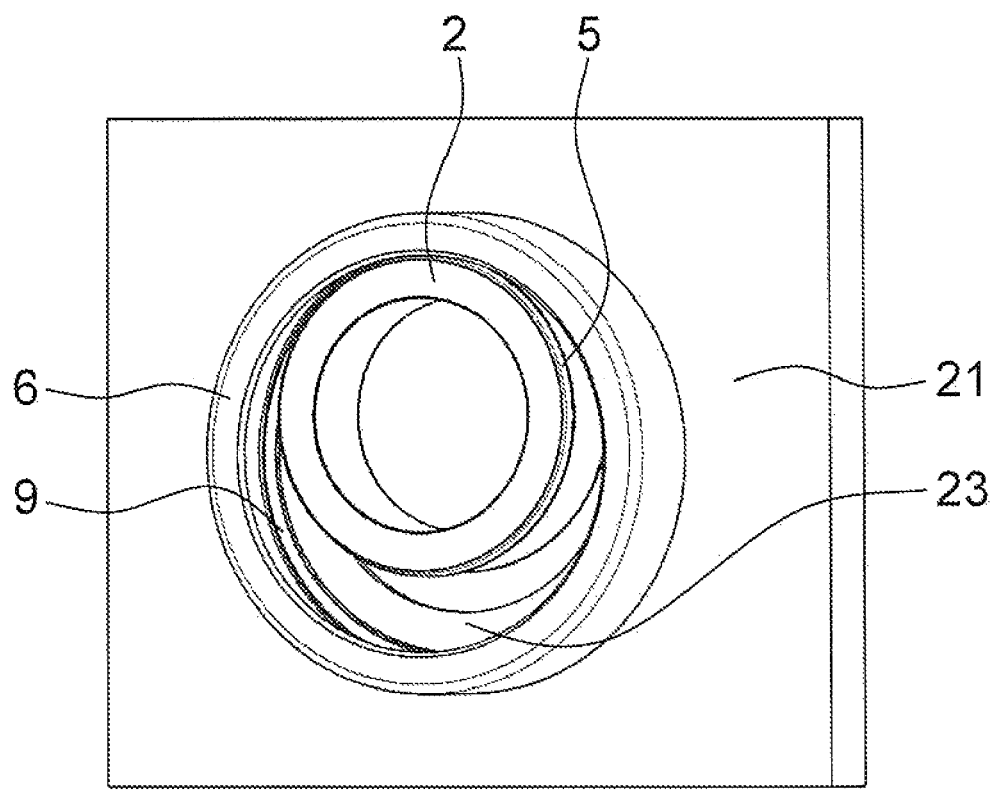
FIG. 6a shows an illustration of the second step of the second variant of the assembly method according to the disclosure in a plan view.
Figure 6B:
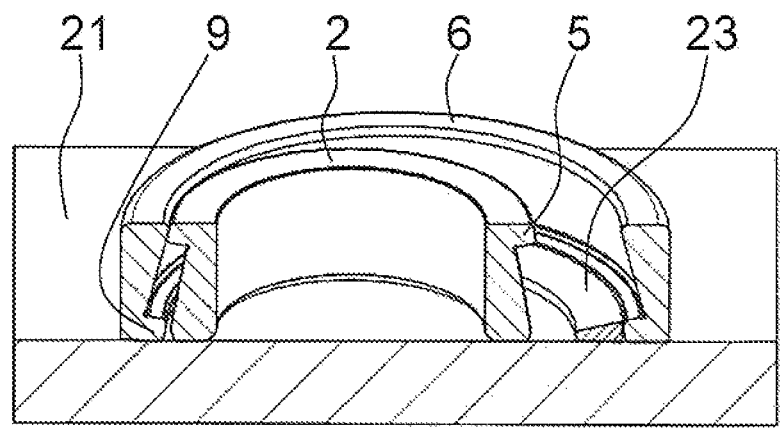
FIG. 6b shows an illustration of the second step of the second variant of the assembly method according to the disclosure in a sectional view.

Similarly to the first variant, it is then the case in a second step that the inner bearing ring 2 is arranged, with its face side formed with the rim 5 upward, eccentrically with respect to the outer bearing ring 6 such that, as can be seen in FIGS. 6a and 6b, at one side, the auxiliary ramp 23 is arranged between the bearing rings 2, 6 and, at the other side, offset 180° with respect to the center of the auxiliary ramp 23, the bearing rings 2, 6 bear against one another.

Figure 7A:
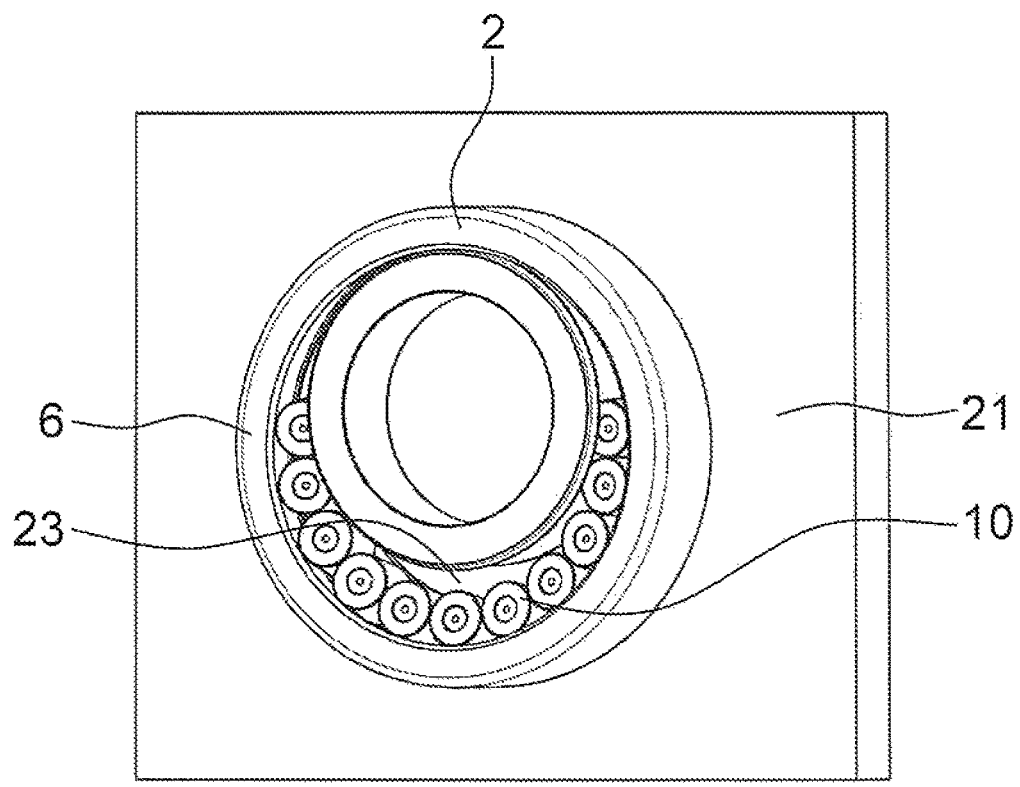
FIG. 7a shows an illustration of the third step of the second variant of the assembly method according to the disclosure in a plan view.
Figure 7B:
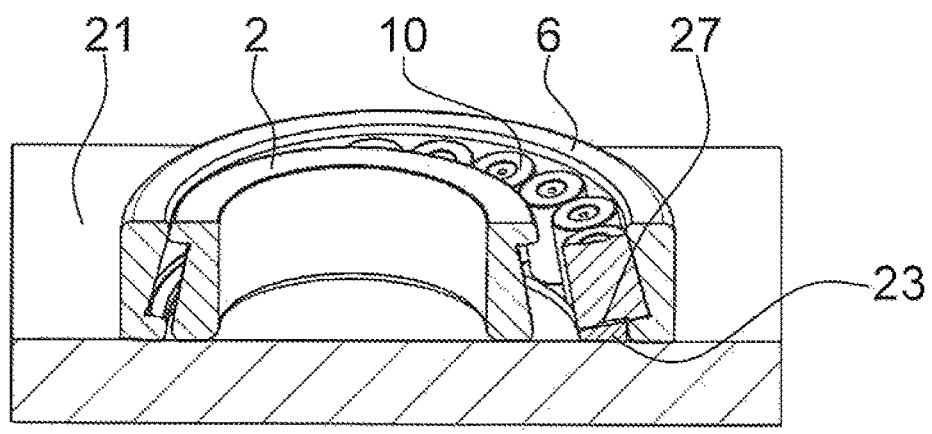
FIG. 7b shows an illustration of the third step of the second variant of the assembly method according to the disclosure in a sectional view.

Then, in a third step illustrated in FIGS. 7a and 7b, it is the case here too that the sickle-shaped free space formed between the inner bearing ring 2 and the outer bearing ring 6 is filled with the roller-type rolling bodies 10 in the form of tapered rollers, but with the difference that, here, the relatively large face sides of said roller-type rolling bodies 10 lie on the oblique side 27 of the auxiliary ramp 23.

Figure 8A:
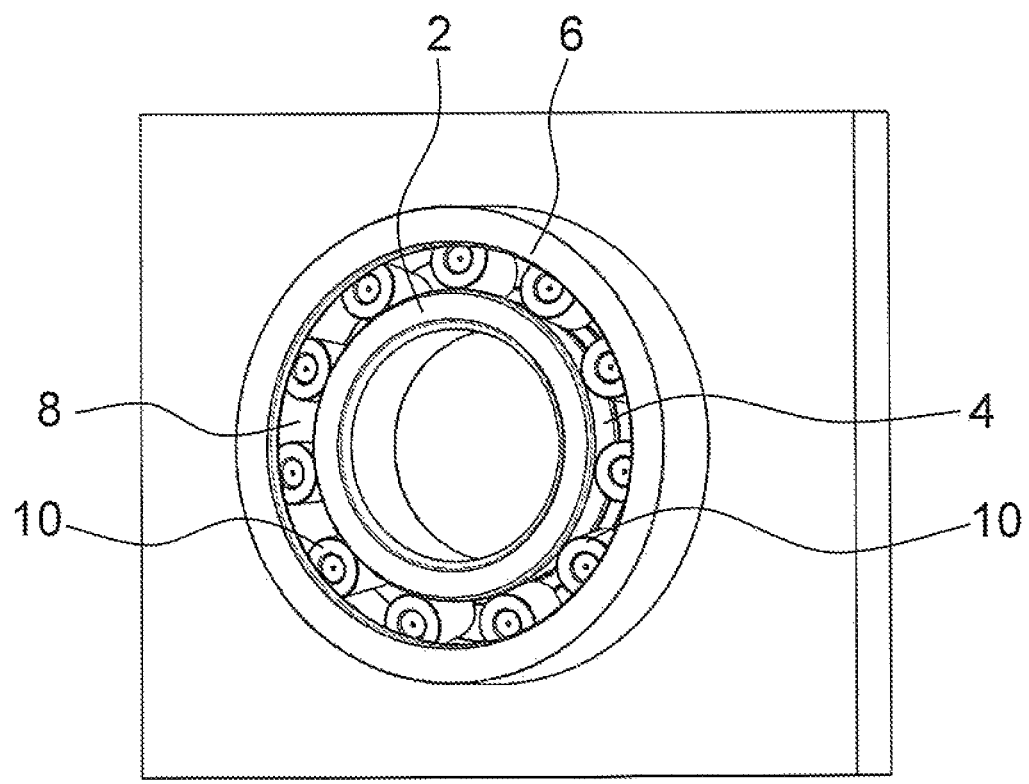
FIG. 8a shows an illustration of the fifth step of both variants of the assembly method according to the disclosure in a plan view.
Figure 8B:
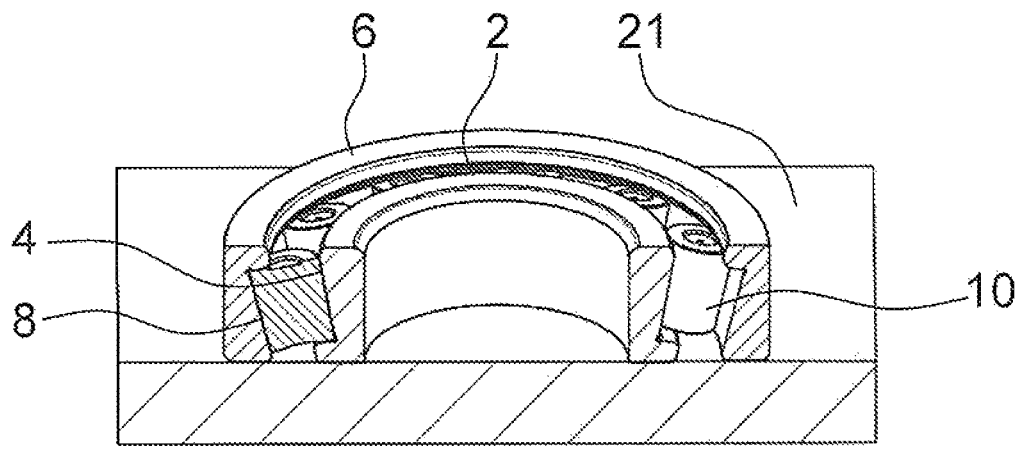
FIG. 8b shows an illustration of the fifth step of both variants of the assembly method according to the disclosure in a sectional view.

Independently of the two variants of the eccentric assembly method, it is then the case in a fourth step which is not illustrated in any more detail in the drawings that the outer bearing ring 3 is clamped, at the level of the contact point with the inner bearing ring 2 and at the level of a point on the outer shell surface of said outer bearing ring which is offset 180° with respect to the contact point, such that the outer bearing ring 3 is slightly ovalized within its elasticity limit. Subsequently, as can be seen from FIGS. 8a and 8b, in a fifth step, the inner bearing ring 2 is displaced into a coaxial position with respect to the outer bearing ring 3, and the roller-type rolling bodies 10 are uniformly circumferentially distributed in their raceways 4, 8 in the bearing rings 2, 6, with the ovalization of the outer bearing ring 3 being eliminated.

Figure 9A:
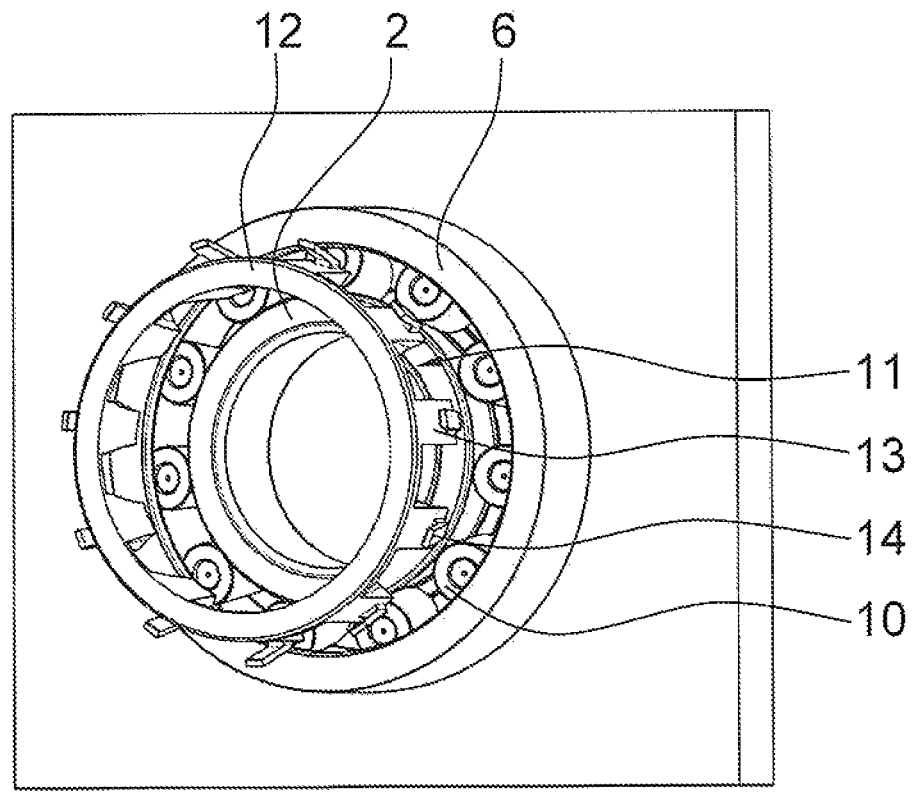
FIG. 9a shows an illustration of the sixth step of both variants of the assembly method according to the disclosure in a plan view.
Figure 9B:
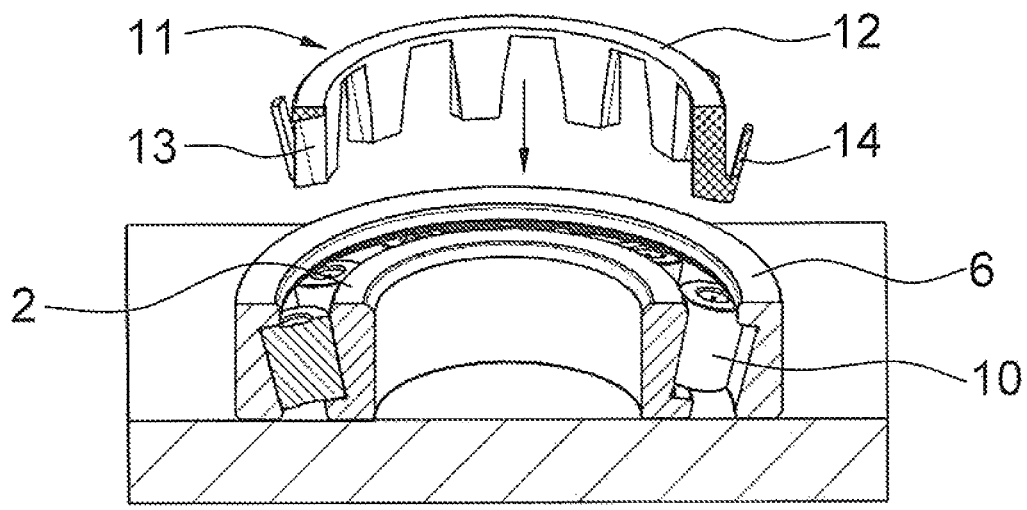
FIG. 9b shows an illustration of the sixth step of both variants of the assembly method according to the disclosure in a sectional view.

In the case of the first variant of the eccentric assembly method according to the disclosure being implemented, it is then the case in a sixth step, which for the sake of simplicity is however not illustrated in the drawings, that the bearing cage 11 in the form of a comb-type cage is inserted with its cage webs 13 between the roller-type rolling bodies 10 from the side with the relatively small face sides of said roller-type rolling bodies, and said bearing cage is engaged with its detent lugs with detent action against the inner surface of the rim 5 on the inner bearing ring 2. In the case of the second variant of the eccentric assembly method according to the disclosure being implemented, it is by contrast the case in a sixth step that the bearing cage 11 in the form of a comb-type cage is, as shown in FIGS. 9a and 9b, inserted with its cage webs 13 between the roller-type rolling bodies 10 from the side with the relatively large face sides of said roller-type rolling bodies, and, as shown in FIG. 1, said bearing cage is engaged with its detent webs 14 with detent action against the inner surface 15 of the rim 9 on the outer bearing ring 6. Finally, it is then also the case that the bearing interior space 20 is filled with lubricant, and the two elastomer sealing disks 18, 19 are inserted into the encircling fastening grooves 16, 17 in the inner shell surface 7 of the outer bearing ring 6 in the manner likewise illustrated in FIG. 1.

Finally, FIGS. 10a, 10b and 11a, 11b illustrate the auxiliary ramps 22 and 23 for carrying out the two variants of the eccentric assembly method according to the disclosure. Here, the auxiliary ramp 22 used for the first method variant is distinguished by the fact that it bears with its inner diameter side 24 against the inner bearing ring 6 and, as can be clearly seen in FIGS. 10a and 10b, has an oblique side 26, which tapers toward the outer bearing ring 3 with the angle of inclination of the raceway 4 in the inner bearing ring 2, and a maximum ramp height hR which corresponds to the rim height hBI on the inner bearing ring 2.

By contrast, the auxiliary ramp 23 used for the second method variant is distinguished by the fact that it bears with its outer diameter side 25 against the outer bearing ring 6 and, as can be seen in FIGS. 11a and 11b, has an oblique side 27, which tapers toward the inner bearing ring 2 with the angle of inclination of the raceway 8 in the outer bearing ring 6, and a maximum ramp height hR which corresponds to the rim height hBA on the outer bearing ring 6.

LIST OF REFERENCE DESIGNATIONS

Angular contact roller bearing
Inner bearing ring
Outer shell surface of 2
Inner raceway in 2
Rim on 4
Outer bearing ring
Inner shell surface of 6
Outer raceway in 6
Rim on 8
Roller-type rolling body
Bearing cage
Cage ring of 11
Cage webs on 12

Detent webs on 13
Inner surface of 9
Fastening groove in 7
Fastening groove in 7
Elastomer sealing disk
Elastomer sealing disk
Bearing interior space
Assembly plane
Auxiliary ramp
Auxiliary ramp
Inner diameter side of 22
Outer diameter side of 23
Oblique side on 22
Oblique side on 23
AL Bearing axis of rotation
δ Taper angle
β Envelope circle angle
S Gap between 3 and 7
DW Greatest diameter of 10
hBI Rim height on 2
hBA Rim height on 6
hR Ramp height

The invention claimed is:

1. A method for producing an angular contact roller bearing with unilaterally delimiting rims, comprising:
conically forming an inner raceway into a cylindrical section of an outer shell surface of an inner bearing ring such that the inner raceway is inclined relative to a bearing axis of rotation (AL) and is delimited at one end by a rim;
conically forming an outer raceway into a cylindrical section of an inner shell surface of an outer bearing ring such that the outer raceway is inclined relative to the bearing axis of rotation (AL) and is delimited at one end by a rim;
assembling, via an eccentric assembly method, the inner and outer bearing rings and a multiplicity of roller-type rolling bodies, which roll on the raceways of said bearing rings;
the eccentric assembly method including:
in a first step the inner bearing ring is placed with the inner bearing ring face side formed with the rim, onto a horizontal assembly plane with a convex sickle-shaped auxiliary ramp in such a way that said inner bearing ring bears with the inner bearing ring rim against an inner diameter side of the auxiliary ramp;
in a second step the outer bearing ring is arranged with the outer bearing ring face side formed with the rim upward, eccentrically with respect to the inner bearing ring such that, at one side, the auxiliary ramp is arranged between the bearing rings and, at the other side, offset 180° with respect to a center of the auxiliary ramp, the bearing rings bear against one another;
in a third step a sickle-shaped free space formed between the outer bearing ring and the inner bearing ring is filled with the roller-type rolling bodies in the form of tapered rollers such that relatively small face sides of said roller-type rolling bodies lie on an oblique side of the auxiliary ramp;
in a fourth step of the eccentric assembly method, the outer bearing ring is clamped, at a level of a contact point with the inner bearing ring and at a level of a point on the outer shell surface of said outer bearing ring which is offset 180° with respect to the contact point, such that the outer bearing ring is slightly ovalized within its elasticity limit; and
in a fifth step the inner bearing ring is displaced into a coaxial position with respect to the outer bearing ring, and the roller-type rolling bodies are uniformly circumferentially distributed in the rolling bodies raceways in the bearing rings, with the ovalization of the outer bearing ring being eliminated.

2. The method as claimed in claim 1, wherein, in a sixth step of the eccentric assembly method, a bearing cage in the form of a comb-type cage is inserted with cage webs between the roller-type rolling bodies from the side with relatively small face sides of said roller-type rolling bodies, and said bearing cage is engaged with detent lugs with detent action against the inner surface of the rim on the inner bearing ring.

3. The method as claimed in claim 1, wherein, in a sixth step of the eccentric assembly method, a bearing cage in the form of a comb-type cage is inserted with cage webs between the roller-type rolling bodies from a side with relatively large face sides of said roller-type rolling bodies, and said bearing cage is engaged with detent webs with detent action against the inner surface of the rim on the outer bearing ring.

4. The method as claimed in claim 3, wherein, in a seventh step, a bearing interior space is filled with lubricant, and two elastomer sealing disks are inserted into encircling fastening grooves in the inner shell surface of the outer bearing ring.

5. A method for producing an angular contact roller bearing with unilaterally delimiting rims, comprising:
conically forming an inner raceway into a cylindrical section of an outer shell surface of an inner bearing ring such that the inner raceway is inclined relative to a bearing axis of rotation (AL) and is delimited at one end by a rim;
conically forming an outer raceway into a cylindrical section of an inner shell surface of an outer bearing ring such that the outer raceway is inclined relative to the bearing axis of rotation (AL) and is delimited at one end by a rim;
assembling, via an eccentric assembly method, the inner and outer bearing rings and a multiplicity of roller-type rolling bodies, which roll on the raceways of said bearing rings;
the eccentric assembly method including:
in a first step of the eccentric assembly method, the outer bearing ring is placed, with the outer bearing ring face side formed with the rim, onto a horizontal assembly plane with a convex sickle-shaped auxiliary ramp in such a way that said outer bearing ring bears with the outer bearing ring rim against an outer diameter side of the auxiliary ramp;
in a second step of the eccentric assembly method, the inner bearing ring is arranged, with the inner bearing ring face side formed with the rim upward, eccentrically with respect to the outer bearing ring such that, at one side, the auxiliary ramp is arranged between the bearing rings and, at the other side, offset 180° with respect to a center of the auxiliary ramp, the bearing rings bear against one another;
in a third step of the eccentric assembly method, a sickle-shaped free space formed between the inner bearing ring and the outer bearing ring is filled with the roller-type rolling bodies in the form of tapered rollers such that relatively large face sides of said roller-type rolling bodies lie on an oblique side of the auxiliary ramp;

in a fourth step of the eccentric assembly method, the outer bearing ring is clamped, at a level of a contact point with the inner bearing ring and at a level of a point on the outer shell surface of said outer bearing ring which is offset 180° with respect to the contact point, such that the outer bearing ring is slightly ovalized within its elasticity limit; and in a fifth step the inner bearing ring is displaced into a coaxial position with respect to the outer bearing ring, and the roller-type rolling bodies are uniformly circumferentially distributed in the rolling bodies raceways in the bearing rings, with the ovalization of the outer bearing ring being eliminated.

6. The method as claimed in claim 5, wherein, in a sixth step of the eccentric assembly method, a bearing cage in the form of a comb-type cage is inserted with cage webs between the roller-type rolling bodies from the side with relatively small face sides of said roller-type rolling bodies, and said bearing cage is engaged with detent lugs with detent action against the inner surface of the rim on the inner bearing ring.

7. The method as claimed in claim 5, wherein, in a sixth step of the eccentric assembly method, a bearing cage in the form of a comb-type cage is inserted with cage webs between the roller-type rolling bodies from a side with relatively large face sides of said roller-type rolling bodies, and said bearing cage is engaged with detent webs with detent action against the inner surface of the rim on the outer bearing ring.

8. The method as claimed in claim 7, wherein, in a seventh step, a bearing interior space is filled with lubricant, and two elastomer sealing disks are inserted into encircling fastening grooves in the inner shell surface of the outer bearing ring.

* * * * *